No. 854,992. PATENTED MAY 28, 1907.
J. EHNI.
CENTERING DEVICE.
APPLICATION FILED OCT. 19, 1906.
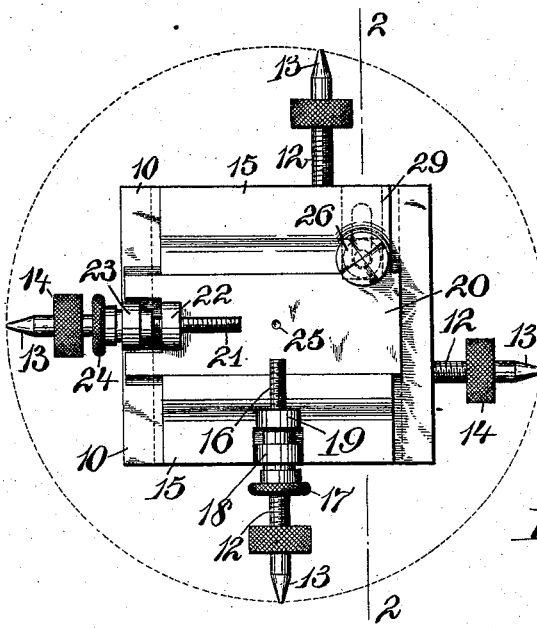
Fig. 1
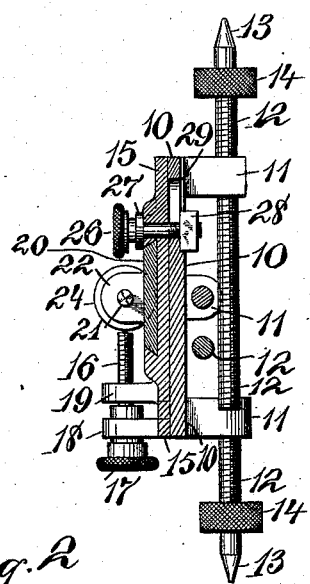
Fig. 2
Fig. 3
WITNESSES:
Ralph Lancaster
E. A. Pell
INVENTOR
Jacob Ehni
BY
Wm H Caufield
ATTORNEY
THE NORRIS PETERS CO., WASHINGTON, D. C.

UNITED STATES PATENT OFFICE.

JACOB EHNI, OF BLOOMFIELD, NEW JERSEY.

CENTERING DEVICE.

No. 854,992.   Specification of Letters Patent.   Patented May 28, 1907.

Application filed October 19, 1906. Serial No. 339,638.

*To all whom it may concern:*

Be it known that I, JACOB EHNI, a citizen of the United States, residing at Bloomfield, in the county of Essex and State of New Jersey, have invented certain new and useful Improvements in Centering Devices; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a centering device for finding the centers in machine elements, such as in castings and parts that go to make up machinery, and is designed to provide a center that can be used for markings, and that allows it an easy manipulation to arrive at the proper point.

The invention is designed to provide a device of this kind that is capable of a wide range of adjustment, and that can be securely locked in its adjusted position.

The invention is illustrated in the accompanying drawings, in which

Figure 1 is a face view of the device showing it placed in the bore of a perforation. Fig. 2 is a vertical section on line 2, 2, in Fig. 1, and Fig. 3 is a perspective view of a modified form of the structure.

The invention consists of a base plate 10, and around the edges of the base plate, on the reverse side, are the bearings 11, each being provided with a screw-threaded perforation in which are screwed the screw-threaded shanks 12, having the ends 13 for engaging the inside surface of a perforation, which is shown in dotted outline in Fig. 1. A collar or flange 14 is provided, on each screw, to furnish means for its manual operation, and these screws, on the opposed sides, are preferably arranged out of alinement so that they can be made longer and thus overlap and provide a wider range of adjustment than if they were in line and abutted when they were screwed into their smallest compass. These screws are screwed out to engage the elements, the common center of which is to be determined, and thus hold the device securely in this position.

On the face of the base plate 10 is a sliding plate 15 which slides in one direction on the base plate 10, and is operated by a screw 16 having the head 17, this screw bearing in a clip 18 on the base plate 10, and operating through a screw-threaded perforation in the clip 19 on the sliding plate 15. This provides for a finer adjustment of the centering point in one direction, and mounted on this sliding plate 15, but arranged to slide at right angles to the direction of movement of the plate 15, is a slide 20 which is operated by the screw 21 engaging a screw-threaded perforation in the clip 22, and bearing on the stud 23 on the plate 15. A handle 24 allows the ready operation of the screw. A centering point 25 is arranged on this slide 20 and is approximately centered when the screws 12 are adjusted, but by means of a pair of calipers, the machinist can, in the usual way, determine the exact center, and by means of the two screws 16 and 21 operating the slide plate 15 and the slide 20 respectively, bring the center point 25 at its exact location. When the center is determined and the center point is in its proper place, the elements can all be locked together by means of a screw 26 passing down through the slide plate on the base plate, and having a flange 27 bearing on the slide, the whole being fastened by means of a nut 28 which is prevented from turning by fitting down into a groove 29.

In Fig. 3 I show a modification with a single block 30 which is provided with the screw 31, each of which has a head 32 for operating it, and an end portion 33 for engaging the inside of a perforation. The screws work in the screw-threaded perforations 34 in the block 30 and are arranged to have a long adjustment, for the reason that no two of them are axially in line, and the opposed screws, on each face, are arranged to be also out of line. The centering point 35 can be arrived at by a proper manipulation of the screws.

This mechanism is slower than the previous description, but is adapted for very small work, where it is now customary to force in a block of wood, and on this block the center is found by means of calipers, and then it is marked with a center punch.

This mechanism is extremely handy to a machinist, and is stable and easily removed when the work is completed, by simply screwing in the screws 12 to loosen the device.

Having thus described my invention, what I claim is:—

1. A centering device comprising a base plate, screws projecting radially therefrom from one face, a slide plate arranged on the base plate to move in one direction, a slide on the slide plate arranged to move at right angles thereto, means for independently moving the slide plate on the slide, and a center point designated on the slide.

2. A centering device comprising a base plate, screws arranged to project one from each edge of the base plate and having means on each for its manual operation, a slide plate arranged to slide on the base plate, means for regulating the slide plate, a slide on the slide plate working transversely of the movement of the slide plate, means for operating the slide, a center point on the slide, and a means for locking the slide plate and the slide in their adjusted positions.

3. A centering device comprising a base plate having lugs projecting from one face, screws working in the lugs and arranged to engage the walls of a perforation, a slide plate on the base plate, a screw to operate the slide plate and bearing on the base plate, a slide on the slide plate and operating at right angles thereto, a screw to operate the slide, said screw bearing on the slide plate, a center point on the slide, and a screw working in a slot in the base plate and bearing on the slide plate and the slide to lock the parts in their adjusted positions.

4. A centering device comprising a base plate having, on one face, a shifting and adjustable slide having a center point, and a series of screws arranged to project from the edges of the base plate to engage the walls of a perforation the screws being individually operated.

5. A centering device comprising a base plate having a slide carrying a shifting and adjustable center point on one face, and a series of screws arranged to project from the edges of the base plate, the screws on opposed edges being out of axial alinement, and this pair of screws being arranged in a different plane from the screws on the second pair of opposed edges.

6. A centering device comprising a plate having independently operated screws projecting from its edges, none of the screws being in axial alinement, and a slide carrying a center point on the plate.

7. A centering device comprising a base plate having a center point thereon, and screws projecting from the sides of the base plate, the screws being adapted to be individually operated to place the base plate with the center point central to the ends of the screws, the screws projecting from opposed sides of the base plate being arranged in parallel relation so as to have their inner ends pass beyond the center of the base plate.

In testimony, that I claim the foregoing, I have hereunto set my hand this 17th day of October 1906.

JACOB EHNI.

Witnesses:
E. A. PELL,
WM. H. CAMFIELD.